United States Patent
Salas-Meza et al.

(10) Patent No.: US 6,704,885 B1
(45) Date of Patent: Mar. 9, 2004

(54) PERFORMING DATA BACKUPS WITH A STOCHASTIC SCHEDULER IN A DISTRIBUTED COMPUTING ENVIRONMENT

(75) Inventors: Jose M. Salas-Meza, Fremont, CA (US); Patrick Lupo, Sunnyvale, CA (US); Sajid Hussain, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 565 days.

(21) Appl. No.: 09/627,818

(22) Filed: Jul. 28, 2000

(51) Int. Cl.[7] ............................................... G06F 12/16
(52) U.S. Cl. .............................. 714/6; 711/162; 707/204
(58) Field of Search ..................... 714/15, 6; 707/204; 711/162

(56) References Cited

U.S. PATENT DOCUMENTS

| | | | | |
|---|---|---|---|---|
| 5,495,607 A | * | 2/1996 | Pisello et al. .................. 707/10 |
| 5,778,165 A | * | 7/1998 | Saxon ............................. 714/4 |
| 6,047,294 A | * | 4/2000 | Deshayes et al. ............ 707/204 |
| 6,088,717 A | * | 7/2000 | Reed et al. .................. 709/201 |
| 6,205,527 B1 | * | 3/2001 | Goshey et al. .............. 711/162 |
| 6,301,589 B1 | * | 10/2001 | Hirashima et al. ............. 707/8 |
| 6,453,325 B1 | * | 9/2002 | Cabrera et al. ............. 707/204 |
| 6,460,055 B1 | * | 10/2002 | Midgley et al. ............ 707/204 |
| 6,496,949 B1 | * | 12/2002 | Kanevsky et al. ............. 714/47 |
| 6,505,200 B1 | * | 1/2003 | Ims et al. ....................... 707/8 |
| 6,516,194 B2 | * | 2/2003 | Hanson ...................... 455/433 |
| 6,532,535 B1 | * | 3/2003 | Maffezzoni et al. ........... 713/1 |
| 6,549,921 B1 | * | 4/2003 | Ofek ........................... 707/204 |
| 6,564,336 B1 | * | 5/2003 | Majkowski ..................... 714/4 |
| 6,609,183 B2 | * | 8/2003 | Ohran ......................... 711/161 |
| 6,611,923 B1 | * | 8/2003 | Mutalik et al. ................. 714/4 |
| 6,615,225 B1 | * | 9/2003 | Cannon et al. ............. 707/204 |
| 6,631,477 B1 | * | 10/2003 | LeCrone et al. ............... 714/5 |

OTHER PUBLICATIONS

EMC Corporation, "EMC CLARiiON Backup Storage Solutions, Backup–to–Disk Guide with Legato NetWorker DiskBackup Option (DBO)," Mar. 3, 2003, pp. 1–21.

* cited by examiner

Primary Examiner—Scott Baderman
Assistant Examiner—Anne L. Damiano
(74) Attorney, Agent, or Firm—Christian A. Nicholes; Hickman Palermo Truong & Becker LLP

(57) ABSTRACT

A system and method for performing a data backup with a stochastic scheduler in a distributed computing environment are described. A data set on a client is tracked. The data set is to be maintained with a backup data set on a centralized server within the distributed computing environment. A time period during which to initiate a data backup session for the tracked data set is selected. An instance of a backup session application on the client is periodically executed. The client attempts to initiate a connection with the centralized server beginning at a random start time during the selected time period. The client regularly reattempts the connection initiation following each failed connection initiation attempt. The tracked data set is selectively copied into the backup data set upon a successful connection initiation. Upon each successful data backup session for the tracked data set, a new random start time within the selected time slice for a next data backup session is generated.

28 Claims, 10 Drawing Sheets

PERFORMING DATA BACKUPS WITH A STOCHASTIC SCHEDULER IN A DISTRIBUTED COMPUTING ENVIRONMENT

FIELD OF THE INVENTION

The present invention relates in general to data backups and, in particular, to system and method for performing data backups with a stochastic scheduler in a distributed computing environment.

BACKGROUND OF THE INVENTION

Maintaining complete and accurate data backups are an important part of modem information technology practices. Data backups must be performed on a regular basis to be most effective in ensuring that critical,data is not lost. Historically, data backups were performed predominantly using removable forms of storage media, such as streaming tapes, removable drum and disk drives, floppy diskettes, and similar forms of recordable media. Although data backups are still performed using these types of media, contemporary enterprise, workgroup and mobile computing practices present a broader set of needs than can be met by these traditional backup methodologies alone.

A typical workgroup computing environment contains individual client systems interconnected over a local area network or "intranetwork" located in a departmental setting. An enterprise computing environment generally contains individual intranetworks interconnected over a wide area network or "internetwork" located in a company wide setting. Often, the internetworks includes geographically distributed resources which, when taken as a whole, comprise a unified set of loosely associated computers. The Internet is an example of a widely used public internetwork that can form part of an enterprise computing environment.

Data backups in these environments are generally directed to a centralized server that requests or polls individual clients for data backups on a regularly scheduled basis. However, backup schedules must be coordinated to occur during periods of inactivity for each client without causing client-against-client contention and differences between individual systems, such as hardware configurations and operating systems, must be addressed.

By comparison, mobile computing environments generally consist of conventional notebook and portable computers, but has increasingly included thin clients (diskless workstations), handheld personal data assistants, and other forms of portable and highly portable computing devices. Unlike non-mobile client systems, devices operating in a mobile computing environment, by definition, often function in isolation from other systems. Consequently, data backups must often be deferred until a connection with a data backup server is established.

Independent of computing environment, successfully performing and managing data backups can be difficult and time-consuming. For instance, contention between competing clients concurrently vying to perform data backups must be reconciled. As well, any client-installed software must be consistently configured and kept up-to-date. Furthermore, in the event of corruption, configuration parameters must be readily recoverable without requiring manual reinstallation at each client.

Several prior art data backup applications attempt to provide solutions to these concerns, including Net Backup, licensed by Veritas, Mountain View, Calif.; Networker, licensed by Legato, Sunnyvale, Calif.; and Quick Backup, licensed by McAfee, Santa Clara, Calif. To varying degrees, these solutions fail to satisfactorily address the data backup needs for enterprise, workgroup and mobile computing environments. For instance, the Net Backup application does not allow for automated backup of Registry-files. The Legato and Quick Backup applications are primarily directed to performing data backups in non-mobile computing environments. All of these solutions offer limited customizability, particularly in terms of offering flexible feature sets and in their ability to scale between different environments.

Therefore, there is a need for an approach to performing data backups in enterprise, workgroup and mobile computing environments that avoids conflicts in backup schedules, yet can accommodate the needs of infrequently connected clients. Preferably, such an approach offers a client-based solution that "pushes" data sets to a backup server.

There is a further need for a data backup approach that encapsulates configuration parameters in a monolithic application package, thereby facilitating self-configuration and updates.

SUMMARY OF THE INVENTION

The present invention provides a backup session application that includes a stochastic scheduler for generating a random start time. A data set including individual files with tracked file attributes is regularly copied into a backup data set stored on a centralized server. A data backup session only commences upon a successful connection and failed data backup sessions can be later resumed without duplication of previous file copying. Configuration parameters are encapsulated within the backup session application. Deleted files are maintained on the centralized server until a waiting period has expired.

An embodiment of the present invention is a system and method for performing a data backup with a stochastic scheduler in a distributed computing environment. A data set on a client is tracked. The data set is to be maintained with a backup data set on a centralized server within the distributed computing environment. A time period during which to initiate a data backup session for the tracked data set is selected. An instance of a backup session application on the client is periodically executed. The client attempts to initiate a connection with the centralized server beginning at a random start time during the selected time period. The client regularly reattempts the connection initiation following each failed connection initiation attempt. The tracked data set is selectively copied into the backup data set upon a successful connection initiation. Upon each successful data backup session for the tracked data set, a new random start time within the selected time slice for a next data backup session is generated.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
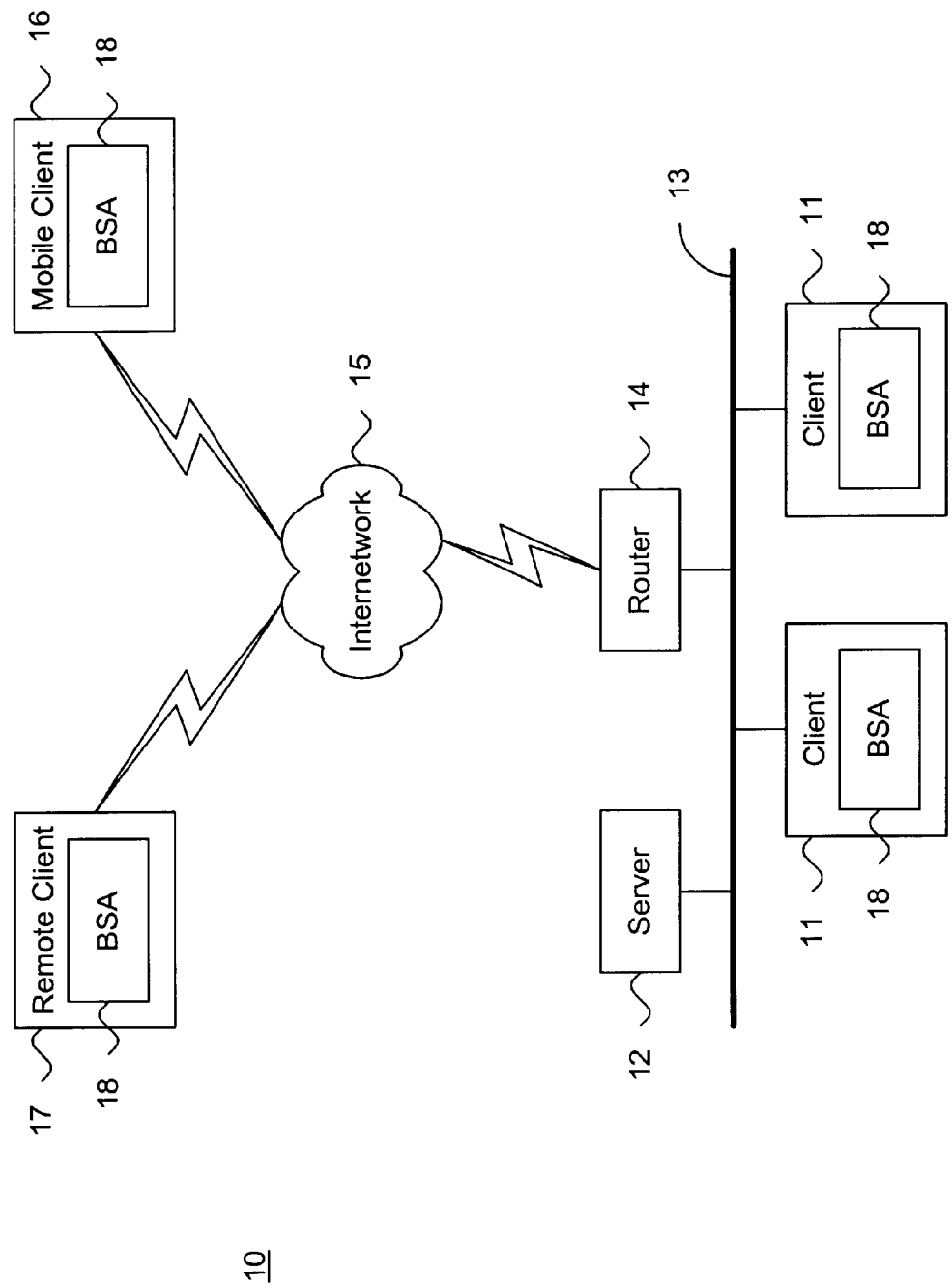
FIG. 1 is a block diagram showing a distributed computing environment, including a system for performing data backups with a stochastic scheduler, in accordance with the present invention.

FIG. 1 is a block diagram showing a distributed computing environment 10, including a system for performing data backups with a stochastic scheduler, in accordance with the present invention. The distributed computing environment 10 consists of a plurality of individual clients 11 interconnected with a centralized server 12 via an intranetwork 13. In turn, the clients 11 and centralized server 12 are connected to an internetwork 15, such as the Internet, through a router 14. Mobile clients 16 and other remote clients 17 can access the intranetwork 13 via the internetwork 15. Other network topologies and configurations of machines and network resources are feasible.

Each of the clients, including intranetwork clients 11, mobile clients 16 and remote clients 17, execute a backup session application 18 (BSA) to periodically perform a data backup to the centralized server 12. The backup session application 18 provides client-based "push" data backups and employs a stochastic scheduler to avoid contention between clients simultaneously competing for access to the centralized server 12.

The individual computer systems, including intranetwork clients 11, mobile clients 16, remote clients 17, and centralized server 12, are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. Program code, including software programs, and data are loaded into the RAM for execution and processing by the CPU and results are generated for display, output, transmittal, or storage.

Figure 2:
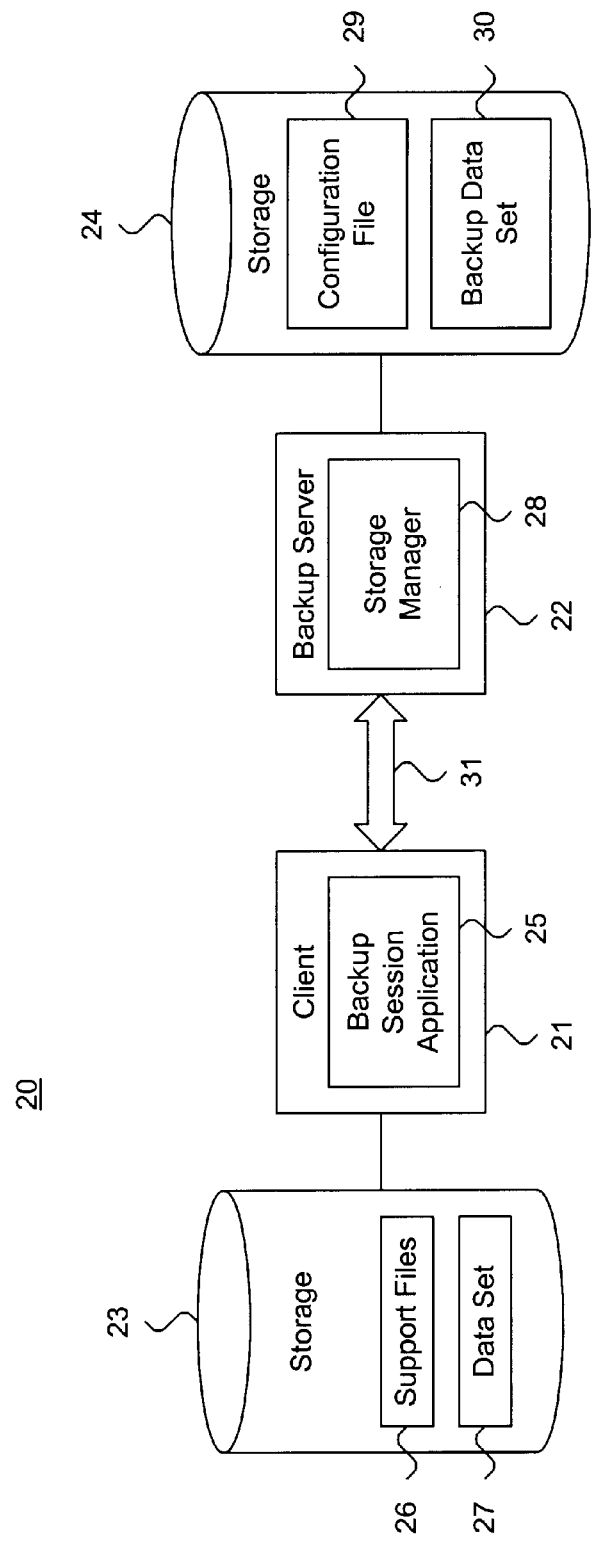
FIG. 2 is a detail block diagram showing a client and server pairing of the system of FIG. 1.

FIG. 2 is a detail block diagram showing a client and server pairing 20 of the system of FIG. 1. The client 21 could be a fixed machine, either local or remote, or mobile. Both the client 21 and backup server 22 are interconnected through some means of connection 31, such as a serial, intranetwork, internetwork, telephonic, infrared, or similar interface or combination thereof. In addition, the client 21 and backup server 22 both include a storage device 23, 24, respectively, providing persistent data storage.

The client 21 executes a backup session application 25 providing the necessary functionality for performing data backups on the backup server 22. The backup session application 25 is self-contained and encapsulates an initial configuration. The backup session application 25 maintains a set of support files 26, including a local configuration file, on the storage device 23. As a backup, however, the backup session application 25 also stores a remote configuration file 29 on the storage device 24.

The backup server 22 does not execute any backup applications. Rather, the client 21 "pushes" backups of a data set 27 maintained on the storage device 23 to the backup server 22 on a regular, stochastically scheduled basis. The backup server 22 includes some form of storage manager 28, such as a file or database manager, with which the backup session application 25 interfaces to effect storage of a backup data set 30 on the storage device 24.

Figure 3:
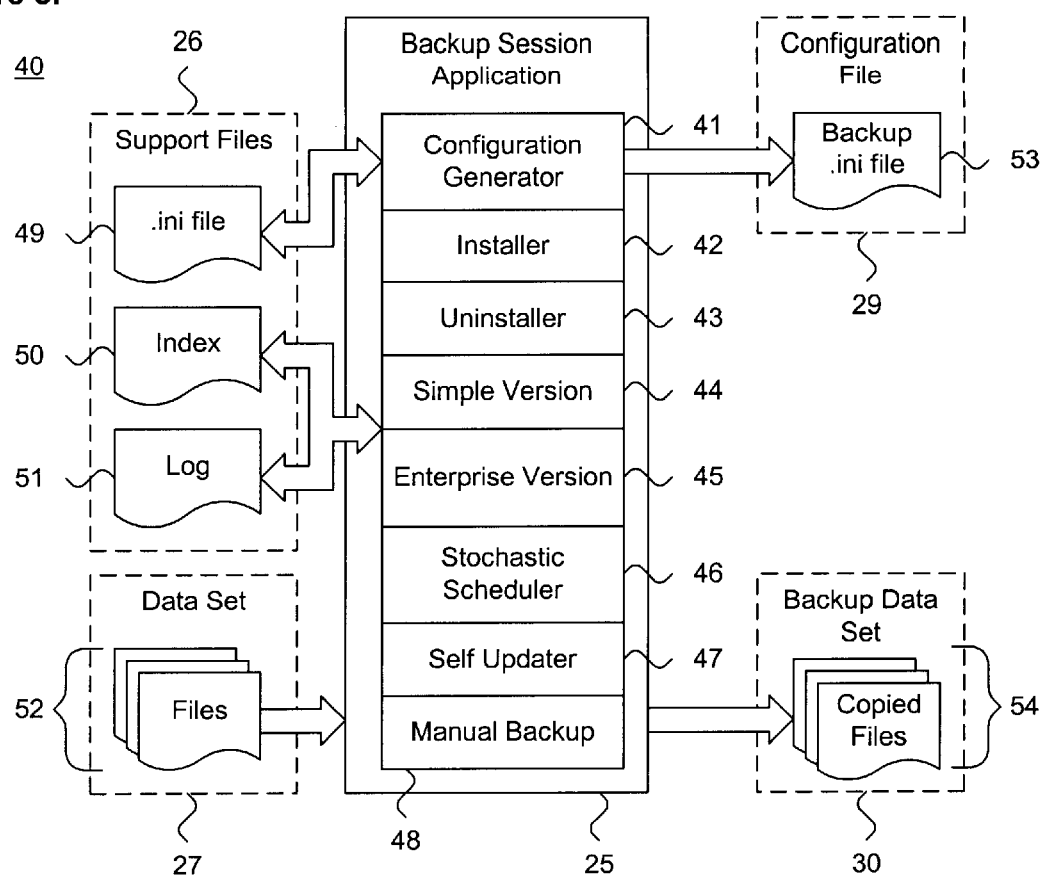
FIG. 3 is a block diagram showing the functional software modules of the backup session application of FIG. 2.

FIG. 3 is a block diagram showing the functional software modules of the backup session application 25 of FIG. 2. Each module is a computer program written as source code in a conventional programming language, such as the C++ programming language, and is presented for execution by the CPU as object or byte code, as is known in the art. The various implementations of the source code and object and byte codes can be held on a computer-readable storage medium or embodied on a transmission medium in a carrier wave.

The backup session application 25 consists of eight modules: configuration generator 41, installer 42, uninstaller 43, simple version 44, enterprise version 45, stochastic scheduler 46, self-updater 47, and manual backup 48. The backup session application 25 maintains support files 26 locally in the storage device 23, including a .ini file 49, an index file 50, and a log file 51, and maintains a configuration file 29, including a backup .ini file 53, remotely in the storage device 24. The individual files 52 in the data set 27 are the primary inputs of the backup session application 25 which copies select files 52 as copied files 54 into the backup data set 30. The backup session application 25 operates in accordance with a sequence of process steps, as further described below beginning with reference to FIG. 6.

Functionally, the configuration generator 41 encapsulates configuration parameters within the backup session application 25 itself. These configuration parameters determine, in part, the default timing, feature set and version of the backup session application 25. The configuration generator 41 maintains a persistent configuration file, call a ".ini" file 49, as well as a backup .ini file 53, on the client 21 and server 22, respectively. In the event of corruption of the .ini files, the local .ini file 49 will override a corrupt backup .ini file 53 and the encapsulated configuration parameters will override both corrupt .ini files. Thus, the encapsulated configuration parameters ensure that the operation of the backup session application 25 can be recovered without requiring manual reinstallation. In addition, the encapsulated configuration parameters allow dynamic self-updating and reconfiguration.

In the described embodiment, the backup session application 25 can be configured as a "simple" version 44 with a minimal feature set or as an "enterprise" version 45 with an extended feature set. Internally, the backup session application 25 is identical irrespective of the configured version.

However, the user interface is tailored to reflect the available features under the premise that an enterprise installation might require further local customization of configuration parameters than a smaller-scale installation.

The installer 42 module performs installation of the backup session application 25 on a new machine, including creating the necessary persistent copies of the .ini file 49 and backup .ini file 53. Conversely, the uninstaller 43 module uninstalls the backup session application 25 and any related components and support files. In the described embodiment, the installer 42 and uninstaller 43 modules conform to the standard installation/deinstallation guidelines for Microsoft Windows-compliant applications.

The stochastic scheduler 46 generates a random start time for a backup session. The user selects a time slice defining a data backup session time period. The stochastic scheduler 46 chooses a unique random start time within this time slice. Since each client 21 is similarly running a stochastic scheduler 46, contention between competing backup sessions is significantly reduced or eliminated by the start time randomness factor.

The self-updater 47 allows the backup session application 25 to be dynamically updated. At the start of every data backup session, the self-updater 47 determines whether a new version of the backup session application 25 is available on the backup server 22. If so, the new version is downloaded and the executing backup session application 25 is dynamically replaced with an instance of the new backup session application 25.

The manual backup 48 module allows a user to override the stochastically scheduled start time for the next data backup session. Thus, a user can force a full or incremental data backup on demand.

Figure 4:
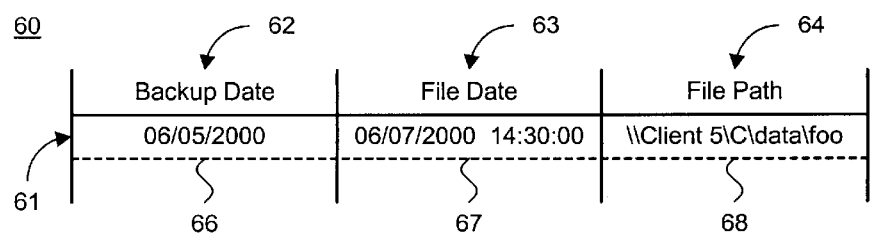
FIG. 4 is a table diagram showing, by way of example, an index file.

FIG. 4 is a table diagram 60 showing, by way of example, an index file 50. The index file 50 contains a plurality of entries 61, one entry 61 per file 52 in the data set 27. Each entry 61 contains three columns of information. The backup date 62 column stores the last date upon which the file 52 was successfully backed up. The file date 63 column stores, as file attributes, the date and time of the last modification to the file 52. Finally, the file path 64 column stores the physical machine location of the file 52. For instance, the example entry indicates a successful backup of the file "\\client 5\C\data\foo" occurred on Jun. 5, 2000 and that this file was last modified on Jun. 7, 2000 at precisely 2:30 pm. Other forms of table and data organization are feasible.

Figure 5:
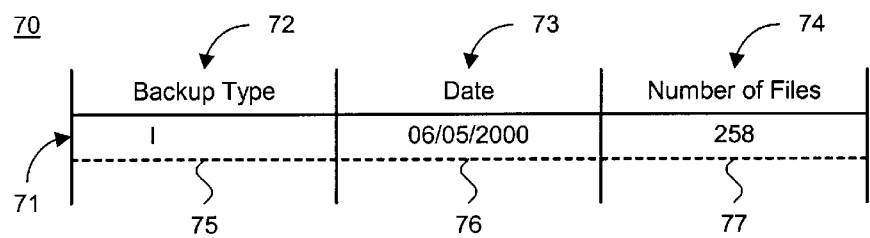
FIG. 5 is a table diagram showing, by way of example, a log file.

FIG. 5 is a table diagram 70 showing, by way of example, a log file 51. The log file 51 contains a plurality of entries 71, one entry 71 per data backup session. Each entry 71 contains three columns of information. The backup type 72 column stores an indication of the outcome of the data backup session, that is, "full," "incremental" or "failed." The date 73 column stores the date of the data backup session. Finally, the number of files 74 column stores the number of files backed up. For instance, the example entry indicates an incremental backup ("I") of 258 files occurred on Jun. 5, 2000. Other forms of table and data organization are feasible.

Figure 6:
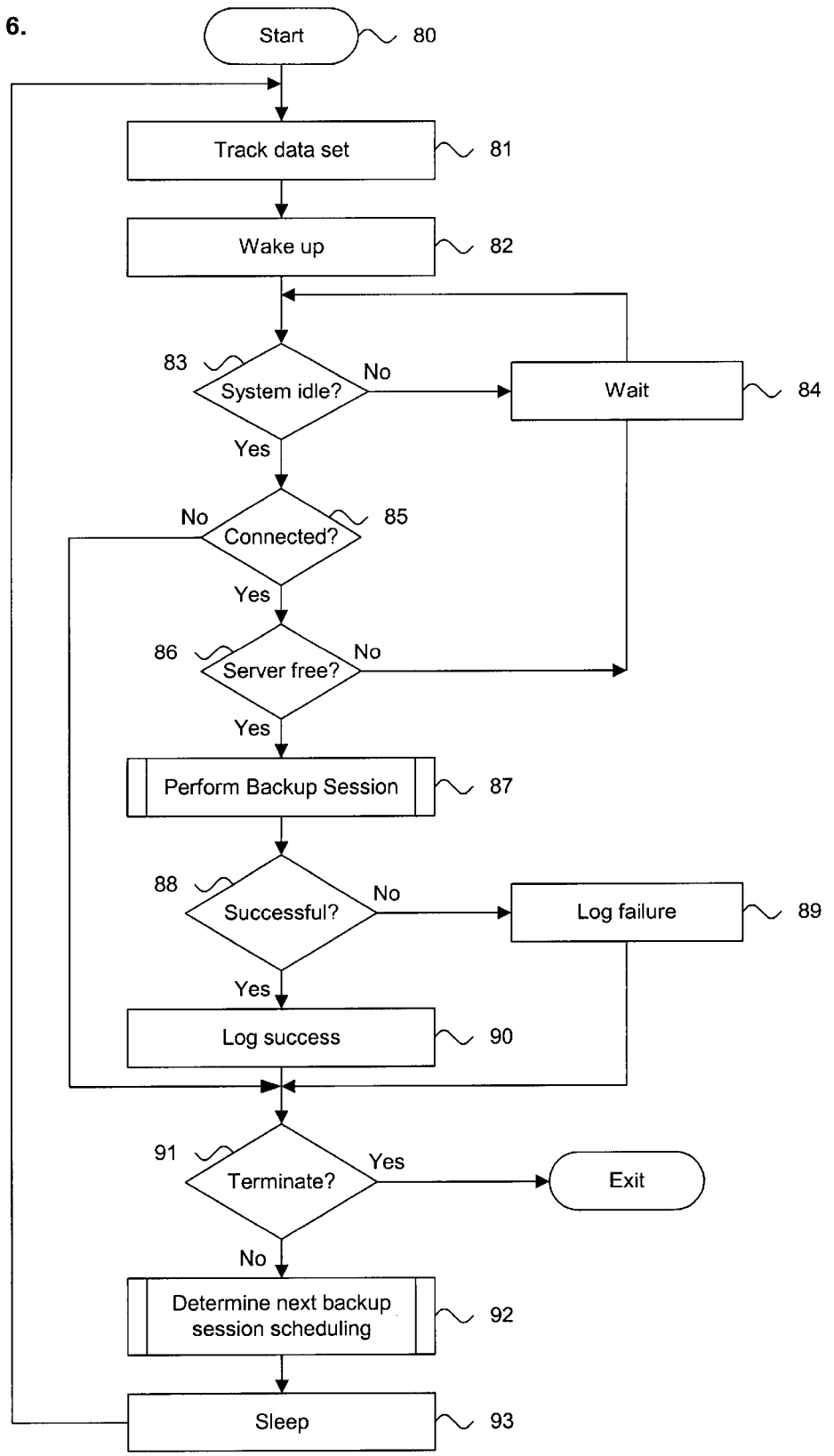
FIG. 6 is a flow diagram showing a method for performing data backups with a stochastic scheduler in accordance with the present invention in accordance with the present invention.

FIG. 6 is a flow diagram showing a method for performing data backups with a stochastic scheduler 80 in accordance with the present invention. The method performs continuously as a background process on the client 21 (shown in FIG. 2). However, if the client 21 is mobile and not connected to a backup server 22 at the time that a backup session is attempted, the data set backup is deferred until at least the next backup session.

Between backup sessions, the data set 27 is tracked (block 81) for addition, modifications and deletions. Generally, the data set 27 is tracked indirectly by the operating system, which automatically places a date and time stamp on the individual files 52 (shown in FIG. 3) in the data set 27 upon creation or modification. At the stochastically scheduled time, as explained further below with reference to FIG. 11, the backup session application 25 wakes up (block 82), that is, is activated to attempt a data backup session. If the client 21 busy processing other tasks (block 83), the backup session application 25 waits (block 84) for a predetermined time period. A default time period of ten minutes is used in the described embodiment.

Otherwise, if the client 21 is idle (block 83), the backup session application 25 determines whether a suitable connection 31 to the backup server 22 is present (block 85). For instance, if the client 21 is mobile, a connection 31 might only be available when the client 21 is physically attached to the backup server 22. Similarly, a low speed connection might be the only means of connecting, but would otherwise be unsuitable for performing a backup session due to low bandwidth. The backup session is stochastically rescheduled (block 92), as further described below with reference to FIG. 11, if there is no suitable connection.

If a suitable connection 31 is present (block 85), the backup session application 25 next determines whether the backup server 22 is available (block 86). "Available" means that the backup server 22 has the necessary capacity to host a backup session in terms of available bandwidth and storage.

Finally, if the backup server 22 is available (block 86), the backup session is performed (block 87), as further described below with reference to FIG. 7. If the backup session fails (block 88), a backup failure entry 71 (shown in FIG. 5) is recorded in the log file 51 (block 89). Otherwise, a success backup entry 71 is recorded in the log file 51 (block 90).

If the backup session application 25 remains live (block 91), the next backup session is stochastically rescheduled (block 92), as further described below with reference to FIG. 11, and the backup session application 25 goes to sleep (block 93), that is, sleeps, until the time for the next backup session attempt. Otherwise, if the backup session application 25 has been terminated (block 91), the method exits.

Figure 7:
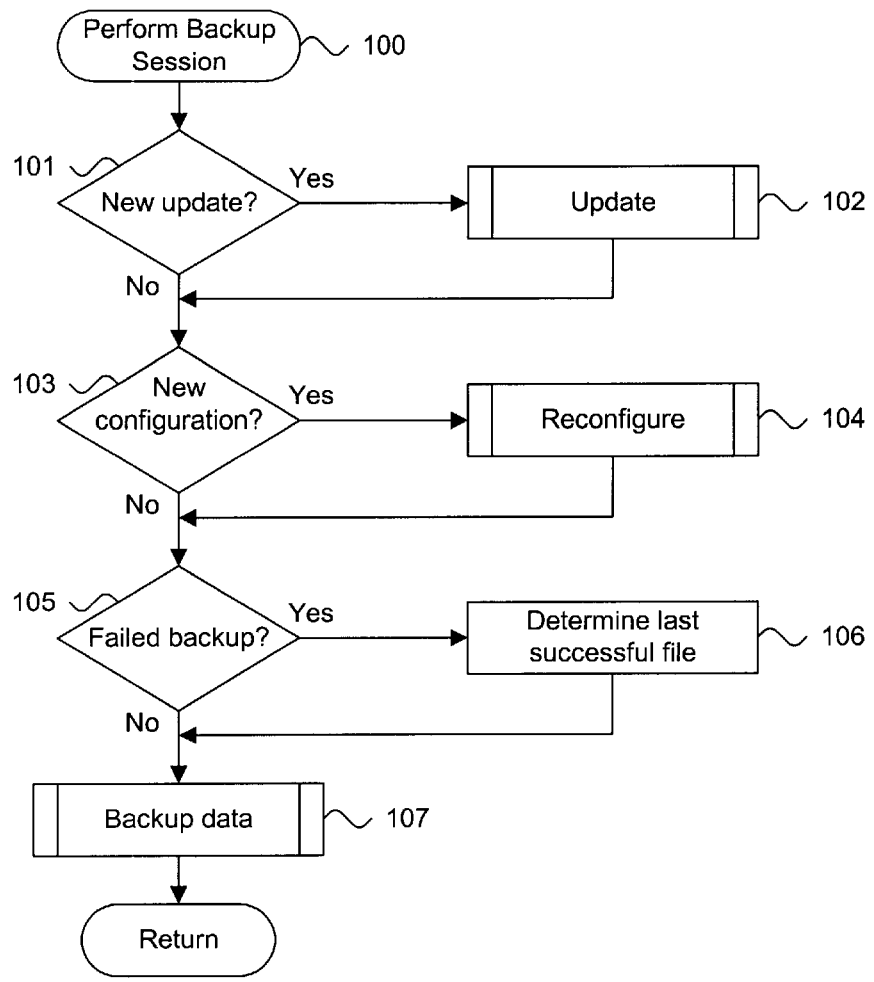
FIG. 7 is a flow diagram showing a routine for performing a backup session for use in the method of FIG. 6.

FIG. 7 is a flow diagram showing a routine for performing a backup session 100 for use in the method of FIG. 6. The purpose of this routine is to process any updates and configuration changes and to backup, or resume a failed backup of, the data set 27 on a file-by-file basis. Thus, if, upon establishing a connection to the backup server 22, a new update of the backup session application 25 is found (block 101), the update is processed (block 102), as further described below with reference to FIG. 8. In the described embodiment, the backup session application 25 compares the size of the currently executing version to any new version found on the backup server 22. Similarly, if a new configuration for the backup session application 25 is found (block 103), the reconfiguration is processed (block 104), as further described below with reference to FIG. 9.

The backup session application 25 can resume a failed backup session using the log file 51 (shown in FIG. 3). If last entry 71 (shown in FIG. 5) in the log file 51 indicates a failed backup (block 105), the name of the last successful file 52 to be backed up is determined from the index file 50 (block 106). The backup session then begins with the next file 52.

Finally, the actual data backup executes (block 107), as further described below with reference to FIG. 10. The files 52 (shown in FIG. 3) in the data set 27 are backed up on a file-by-file basis. The routine then returns.

Figure 8:
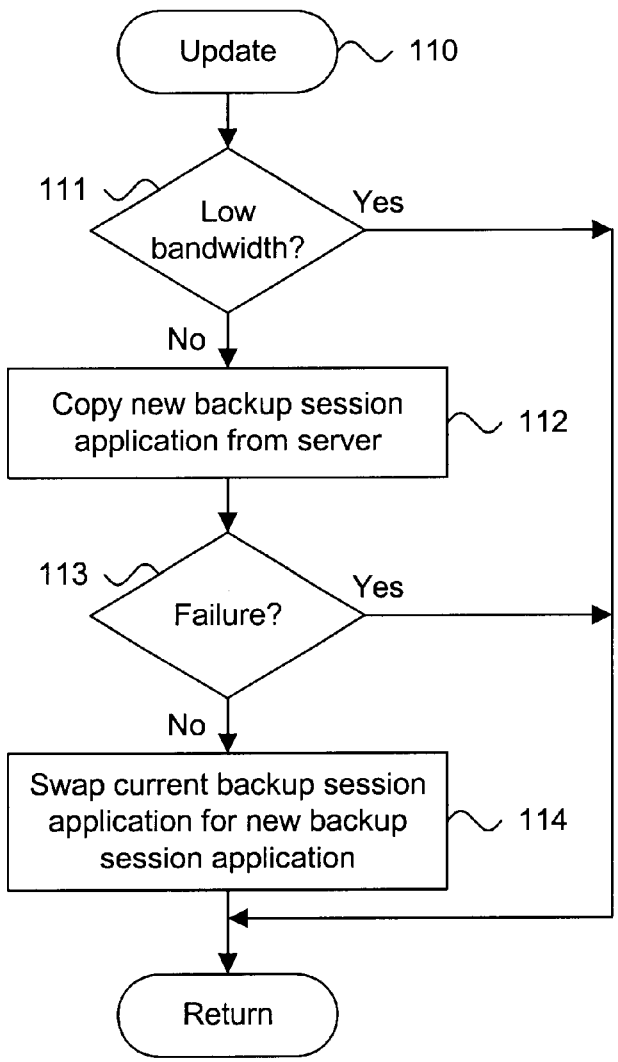
FIG. 8 is a flow diagram showing a routine for performing a self-update for use in the method of FIG. 7.

FIG. 8 is a flow diagram showing a routine for performing a self-update 110 for use in the method of FIG. 7. The purpose of this routine is to dynamically replace an executing backup session application 25 with an updated version. The self-update is only performed over a connection 31 having sufficient bandwidth. In the described embodiment, network connections are favored and dial-up connections are considered unsuitable for self-updates.

Thus, if the connection has low bandwidth (block 111), the self-update is skipped and the routine returns. Otherwise, the new backup session application 25 is copied from the backup server 22 (block 112). If the copy fails (block 113), the self-update is skipped and the routine returns. Otherwise, the currently executing backup session application 25 is swapped with an executing instance of the new backup session application 25 (block 114).

In the described embodiment, the copied backup session application 25 is executed as an interim process using a temporary process name. The interim process terminates the currently executing backup session application 25 and starts a third instance of the backup session application 25 using the same process name as the original backup session application 25. Other techniques for swapping an executing process instance are feasible.

Figure 9:
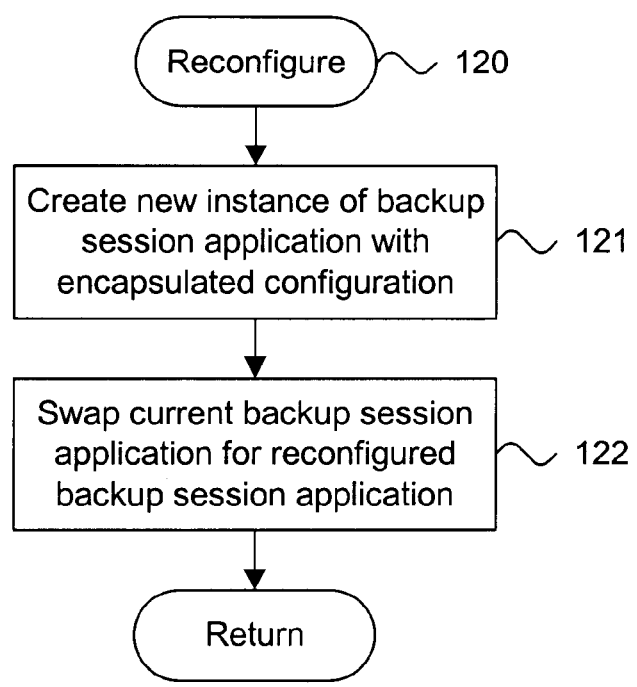
FIG. 9 is a flow diagram showing a routine for performing a reconfiguration for use in the method of FIG. 7.

FIG. 9 is a flow diagram showing a routine for performing a reconfiguration 120 for use in the method of FIG. 7. The purpose of this routine is to dynamically reconfigure an executing backup session application 25.

This routine is similar to the routine for performing a self-update 110. However, the new backup session application 25 is self-generated and contains revised, encapsulated configuration parameters. In the described embodiment, the backup session application 25 includes a reserved memory space of approximately 500 bytes for storing the configuration parameters. The first time the backup session application 25 executes, these configuration parameters are written out as a .ini file 49 (shown in FIG. 3) and copied as a backup .ini file 53. The encapsulated configuration parameters represent default values for the execution of the backup session application 25, thereby ensuring that the backup session application 25 is at minimum self-configuring in the event of the loss of both the .ini file 49 and backup .ini file 53.

Thus, a new instance of the backup session application 25 is created with encapsulated configuration parameters (block 121). The currently executing backup session application 25 is then swapped with an executing instance of the new backup session application 25 (block 122).

In the described embodiment, the reconfigured backup session application 25 is executed as an interim process using a temporary process name. The interim process terminates the currently executing backup session application 25 and starts a third instance of the backup session application 25 using the same process name as the original backup session application 25. Other techniques for swapping an executing process instance are feasible.

Figure 10:
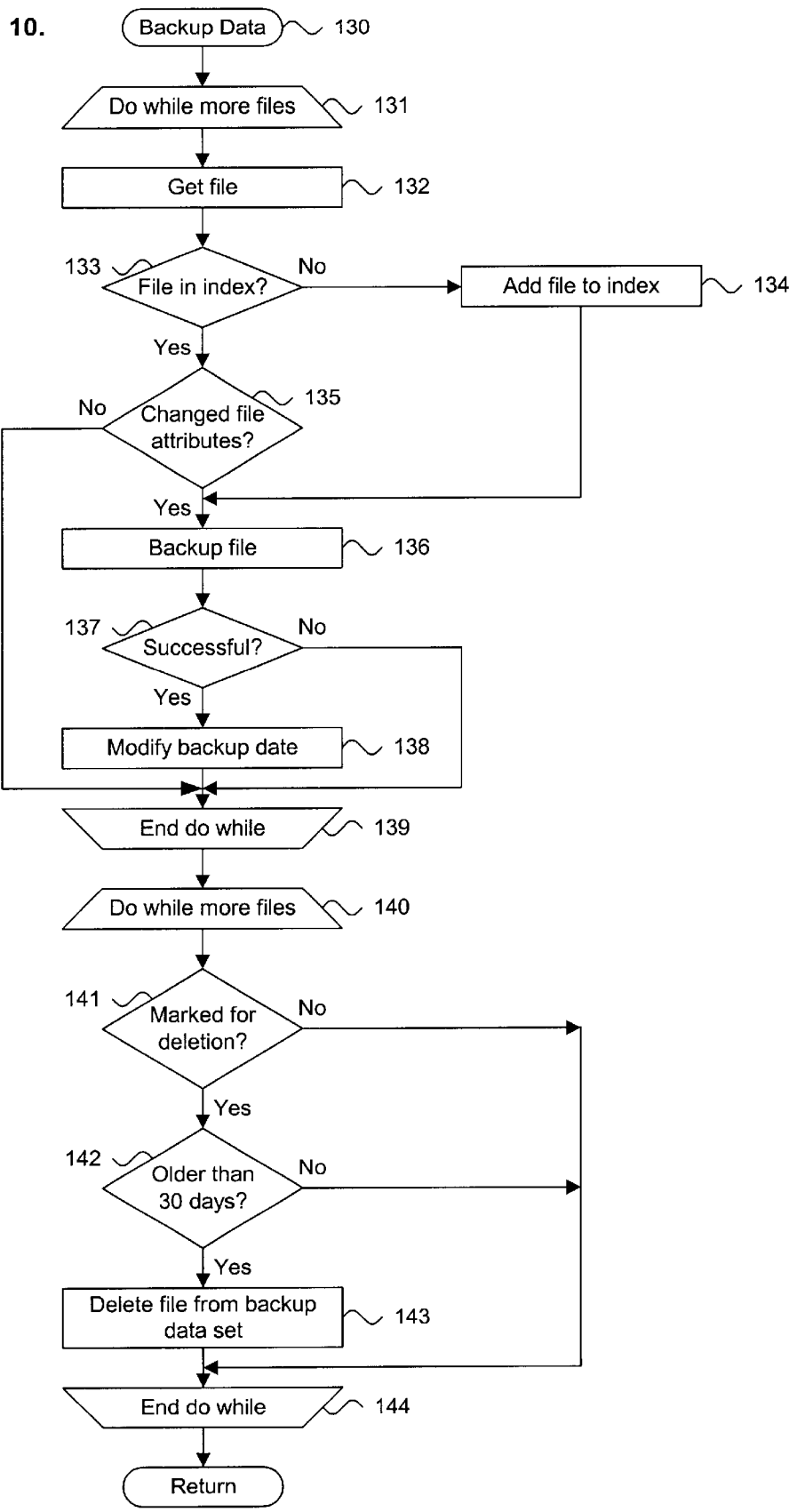
FIG. 10 is a flow diagram showing a routine for performing a data backup for use in the method of FIG. 7.

FIG. 10 is a flow diagram showing a routine for performing a data backup for use in the method of FIG. 7. The purpose of this routine is to perform a file-by-file backup and to process a deferred deletion of files. The routine proceeds in two iterative processing loops for backing up individual files 52 (blocks 131–139) and deleting expired files (blocks 140–144).

During the first processing loop (blocks 131–139), each file 52 is retrieved (block 132) and, if present in the index file 50 (block 133), checked for changed file attributes (block 135). If the file attributes have changed (block 135), the file 52 is copied into the backup data set (block 136). Otherwise, the file 52 is skipped. In the described embodiment, changed file attributes are detected by comparing the date and time of the file 52 against the file date 63 stored in corresponding entry 61 in the index file 50. Other techniques for detecting changed file attributes are feasible. If the retrieved file 52 is not in the index file 50 (block 133), a new entry 61 is made in the index file 50 (block 134) and the file 52 is copied (block 136).

If the file copying is successful (block 137), the backup date 62 in the corresponding entry 61 in the index file 50 is updated (block 138) and iterative processing continues with the next file 52. Otherwise, if the file copying was unsuccessful (block 137), the routine returns.

During the second processing loop (blocks 140–144), each file 52 is checked for a marking for deletion. Any file 52 not marked for deletion is skipped (block 141). Similarly, any file 52 marked for deletion but not older than 30 days is skipped (block 142). Thus, only those files 52 which are both marked for deletion and older than 30 days are deleted from the backup data set 30 (block 143). Iterative processing continues with the next file 52. The routine returns after the last file 52 has been processed.

Figure 11:
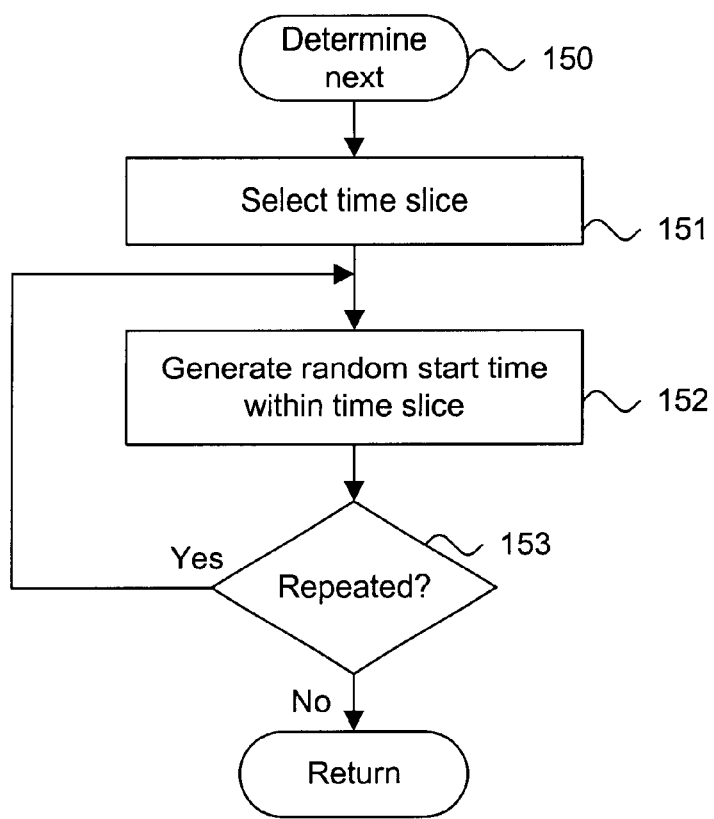
FIG. 11 is a flow diagram showing a routine for determining a next backup session scheduling for use in the method of FIG. 6.

FIG. 11 is a flow diagram showing a routine for determining a next backup session scheduling 150 for use in the method of FIG. 6. The purpose of this routine is to generate a stochastically scheduled backup session. A time slice specified by a desired start time and end time is selected (block 151). A start time for the next data backup session falling within the time slice is randomly chosen (block 152). If the chosen start time was previously used (block 153), a new random start time is generated (block 152). The routine returns upon the successful generation of a start time.

In the described embodiment, the time slice is expressed as a percentage of a day beginning at midnight. Thus, for example, 25% would indicate a time slice starting at midnight and ending at 6:00 am, that is, falling within the first quarter of the day. A start time is randomly chosen within the time slice using a random number generation function, such as rand( ). Other random number functions or techniques could be used, as would be recognized by one skilled in the art.

While the invention has been particularly shown and described as referenced to the embodiments thereof, those skilled in the art will understand that the foregoing and other changes in form and detail may be made therein without departing from the spirit and scope of the invention.

What is claimed is:

1. A method for backing up data from a client to a server, the method comprising the computer-implemented steps of:
   at a first start time for performing a backup of said data from the client to the server, determining at the client whether there exists, between the client and the server, a connection that satisfies specified criteria; and;
   if there does not exist, between the client and the server, a connection that satisfies said specified criteria, then randomly selecting a second start time, within a certain time slice, to reattempt performance of said backup.

2. The method of claim 1, further comprising the steps of:
   at said first start time for performing a backup of said data from the client to the server, determining at the client whether the client is busy with tasks other than performing the backup; and
   if the client is busy with tasks other than performing the backup, then generating a second start time by adding a specified amount of time to said first start time, and reattempting performance of said backup at said second start time.

3. The method of claim 1, wherein the step of determining at the client whether there exists, between the client and the server, a connection that satisfies specified criteria includes determining whether there exists, between the client and the server, a connection with bandwidth that exceeds a specified threshold.

4. The method of claim 1, further comprising the step of, upon successful completion of a backup operation, randomly selecting a start time within a time slice for attempting to perform another backup operation.

5. The method of claim 1, further comprising the steps of:
a first version of a client-side backup application detecting whether a second version of the client-side application resides on said server; and
if a second version of the client-side application resides on said server, then performing the steps of:
retrieving the second version of the client-side application to the client;
at said client, automatically swapping the second version of the client-side application with the first version of the client-side application; and
attempting to perform said backup using said second version of the client-side application.

6. The method of claim 5, further comprising the step of updating client-side backup applications for a plurality of clients by propagating instances of the second version of the client-side backup application from the server to each client of said plurality of clients.

7. The method of claim 5, wherein the step of detecting whether a second version of the client-side application resides on said server is carried out at the start of the performance of said backup.

8. The method of claim 1, further comprising the step of tracking data on said client to be backed up on the server, wherein said tracking includes:
maintaining an index of individual files within the data on the client, the index comprising a plurality of entries storing location and time data corresponding to each individual file.

9. The method of claim 8, further comprising the steps of:
deleting one or more files in the data set on the client;
marking the deletion of said files in the index; and
deferring removal of copies of said files from the server.

10. The method of claim 9, further comprising the step of retaining on the server copies of the deleted files pending expiration of a specified period in which said deleted files are not involved in any operation.

11. The method of claim 8, further comprising the step of, upon an interruption of the performance of a backup of the data, resuming the backup by reference to the index.

12. A method for backing up data from a client to a server, the method comprising the computer-implemented steps of:
at a first start time for performing a backup of said data from the client to the server, determining at the client whether there exists a condition for rescheduling said backup; and
if there exists a condition for rescheduling said backup, then
if the condition is one of a first set of conditions, then randomly selecting a second start time, within a certain time slice, to reattempt performance of said backup; and
if the condition is one of a second set of conditions, then generating a second start time by adding a predetermined amount of time to said first start time, and reattempting performance of said backup at said second start time.

13. The method of claim 12, wherein the step of randomly selecting a second start time is performed in response to failure to detect a connection, between the client and the server, that satisfies specified criteria.

14. The method of claim 12 wherein the step of generating a second start time by adding a specified amount of time to said first start time is performed in response to the client being busy with tasks other than performing said backup.

15. A computer-readable medium carrying one or more sequences of instructions for backing up data from a client to a server which, when executed by one or more processors, causes the one or more processors to perform the steps of:
at a first start time for performing a backup of said data from the client to the server, determining at the client whether there exists, between the client and the server, a connection that satisfies specified criteria; and;
if there does not exist, between the client and the server, a connection that satisfies said specified criteria, then randomly selecting a second start time, within a certain time slice, to reattempt performance of said backup.

16. The computer-readable medium as recited in claim 15, wherein the sequences of instructions further comprise instructions for carrying out the steps of:
at said first start time for performing a backup of said data from the client to the server, determining at the client whether the client is busy with tasks other than performing the backup; and
if the client is busy with tasks other than performing the backup, then generating a second start time by adding a specified amount of time to said first start time, and reattempting performance of said backup at said second start time.

17. The computer-readable medium as recited in claim 15, wherein the step of determining at the client whether there exists, between the client and the server, a connection that satisfies specified criteria includes determining whether there exists, between the client and the server, a connection with bandwidth that exceeds a specified threshold.

18. The computer-readable medium as recited in claim 15, wherein the sequences of instructions further comprise instructions for carrying out the step of, upon successful completion of a backup operation, randomly selecting a start time within a time slice for attempting to perform another backup operation.

19. The computer-readable medium as recited in claim 15, wherein the sequences of instructions further comprise instructions for carrying out the steps of:
a first version of a client-side backup application detecting whether a second version of the client-side application resides on said server; and
if a second version of the client-side application resides on said server, then performing the steps of:
retrieving the second version of the client-side application to the client;
at said client, automatically swapping the second version of the client-side application with the first version of the client-side application; and
attempting to perform said backup using said second version of the client-side application.

20. The computer-readable medium as recited claim 19, wherein the sequences of instructions further comprise instructions for carrying out the step of updating client-side backup applications for a plurality of clients by propagating instances of the second version of the client-side backup application from the server to each client of said plurality of clients.

21. The computer-readable medium as recited in claim 19, wherein the step of detecting whether a second version of the client-side application resides on said server is carried out at the start of the performance of said backup.

22. The computer-readable medium as recited in claim 15, wherein the sequences of instructions further comprise instructions for carrying out the step of tracking data on said client to be backed up on the server, wherein said tracking includes:

maintaining an index of individual files within the data on the client, the index comprising a plurality of entries storing location and time data corresponding to each individual file.

23. The computer-readable medium as recited in claim 22, wherein the sequences of instructions further comprise instructions for carrying out the steps of:

deleting one or more files in the data set on the client;

marking the deletion of said files in the index; and deferring removal of copies of said files from the server.

24. The computer-readable medium as recited in claim 23, wherein the sequences of instructions further comprise instructions for carrying out the step of retaining on the server copies of the deleted files pending expiration of a specified period in which said deleted files are not involved in any operation.

25. The computer-readable medium as recited in claim 22, wherein the sequences of instructions further comprise instructions for carrying out the step of, upon an interruption of the performance of a backup of the data, resuming the backup by reference to the index.

26. A computer-readable medium carrying one or more sequences of instructions for backing up data from a client to a server which, when executed by one or more processors, causes the one or more processors to perform the steps of:

at a first start time for performing a backup of said data from the client to the server, determining at the client whether there exists a condition for rescheduling said backup; and if there exists a condition for rescheduling said backup, then if the condition is one of a first set of conditions, then randomly selecting a second start time, within a certain time slice, to reattempt performance of said backup; and if the condition is one of a second set of conditions, then generating a second start time by adding a predetermined amount of time to said first start time, and reattempting performance of said backup at said second start time.

27. The computer-readable medium as recited in claim 26, wherein the step of randomly selecting a second start time is performed in response to failure to detect a connection, between the client and the server, that satisfies specified criteria.

28. The computer-readable medium as recited in claim 26 wherein the step of generating a second start time by adding a specified amount of time to said first start time is performed in response to the client being busy with tasks other than performing said backup.

* * * * *